Aug. 11, 1936. J. F. WAIT 2,050,772
PROCESS OF REFINING MINERAL OIL
Filed May 15, 1933
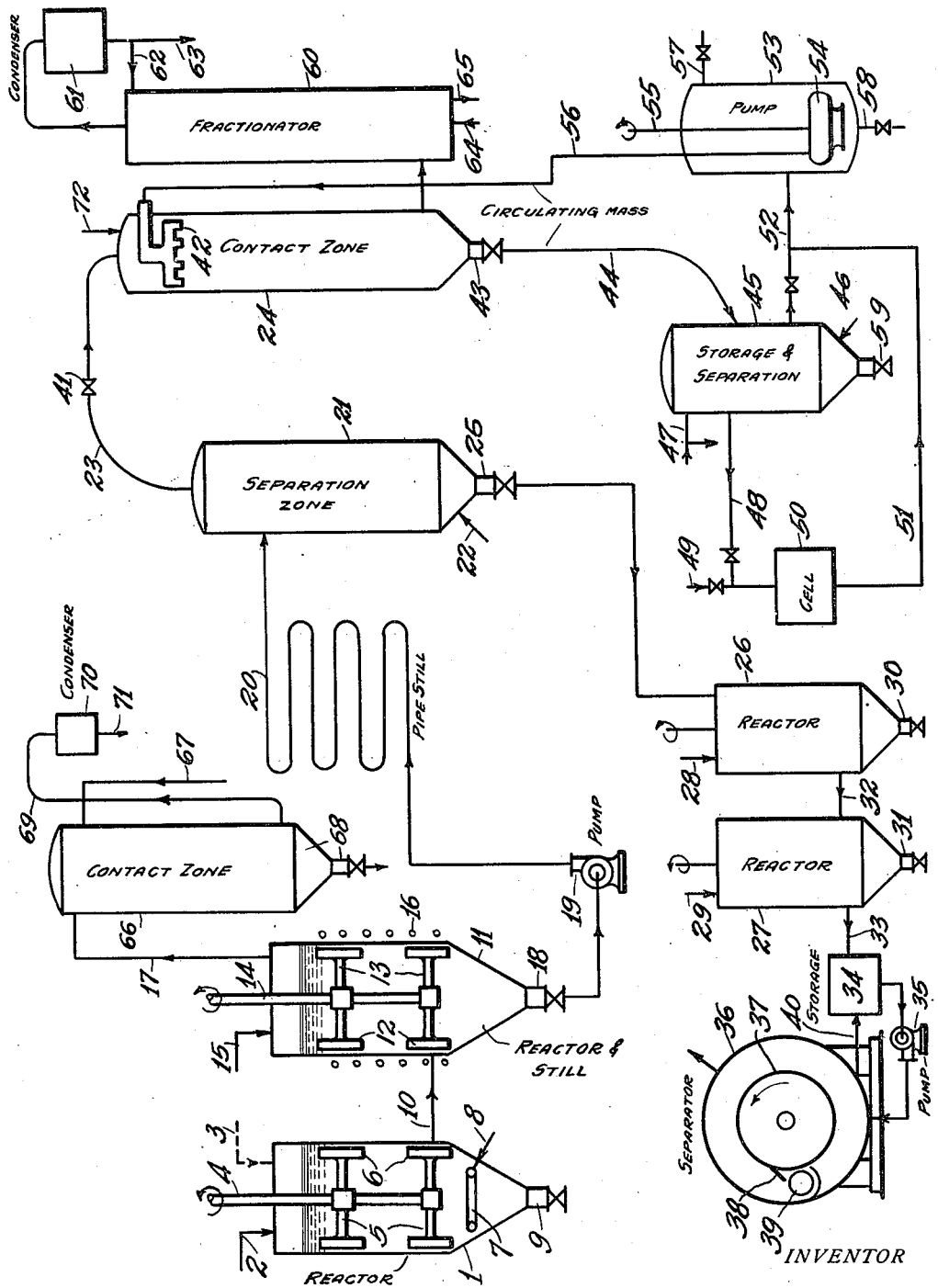
INVENTOR
Justin F. Wait Patented Aug. 11, 1936

2,050,772

UNITED STATES PATENT OFFICE

2,050,772

PROCESS OF REFINING MINERAL OIL

Justin F. Wait, New York, N. Y.

Application May 15, 1933, Serial No. 671,187

13 Claims. (Cl. 196—35)

This invention relates to improved apparatus and methods for treating oil from petroleum and the like by means of light active molten metals such as the alkaline metals including sodium, potassium, calcium and aluminum. It further pertains to use of such metals with compounds thereof or the compounds alone when held under conditions where they act similar to the metals in purifying oil. These compounds which may thus be used as a treating agent are those which when in fused and anhydrous form may be beneficially applied to cooperate with the light metal in improving the oil and they include and are generally similar to alkali hydroxides and chlorides and aluminum chloride. The steps and parts of the invention are applied during treatment in such manner and combination that oils which are so treated may be improved in one or several properties.

Prior methods of refining oil have been generally directed to the use of sulfuric acid with aqueous caustic washes. Adsorptive surfaces have frequently been used. Sulfur dioxide and other solvents have been applied to some extent. Aluminum chloride has been used and other halides suggested. So-called "anhydrous" caustic has been proposed by methods and procedure permitting of from about 1% to 10% of water and wherein water may be accumulated during application.

The use of alkali metal and alkaline earth metal has been suggested for treatment of gasoline and the like for such purpose as removing sulfur. Such application has been at relatively low temperatures whereat the metal is not very active or in a manner whereby action of the metal is inhibited. In other proposed methods highly dispersed metal has been "used" for treating oil at relatively low temperatures. Such methods are not very effective and they involve excessive costs and often unnecessary hazards.

I have found that light active metals are very active at temperatures between about 300° C. and 500° C. as regards oil contacted therewith. By contacting the two in a special manner it becomes practical to treat oil and effect marked purification thereof. I thus utilize oil at a very high temperature whereat excitation or activation is appreciable and direct the reactions obtainable by influence of active metal on the oil. I have found that such metals in compound form may similarly be used and thus employ hydroxides, halides or other salts in appropriate combination. In doing this I utilize such compound in fused or molten state and in the absence of appreciable amounts of water. My preferred method, necessary in some instances, is to have a certain amount of free metal present, the metal being selected so as to readily absorb or remove water or other like reactable substances by chemical reaction therewith.

The main reaction involved in my process is that of molecular rearrangement. The exact mechanisms or kinds of rearrangements in a hydrocarbon as complicated as oil from petroleum is unknown. They are doubtlessly complex and take place in considerable variety. The fact of their occurrences is established by the resulting change in properties which is marked or which may be controlled to produce decided and considerable change in properties. Notwithstanding this, the invention may be applied to a less degree or extent with comparatively little change in some of the properties but with one or more properties changed to a measurable degree by treatment of the oil in the apparatus herein described or by the methods indicated or their equivalent. The metals or their compounds may thus be applied to accomplish considerable more than has heretofore been recognized as obtainable by their use.

Among the improvements in properties obtainable by my invention is increase in viscosity index; another improvement is increase in resistance to acid formation; another is increase in resistance to sludge formation; the amount of carbon deposited in a gasoline engine is greatly reduced; color may be reduced to substantially zero or to a light shade as desired; gum forming substances are reduced or practically eliminated; and odor is improved. One or more of these improvements may be realized by applying the process in accordance with experimental work and tests of the output thereof. I recognize that my invention requires such tests to obtain the best results. If this is not done, "blind" application may in some instances even lower one or more qualities of the oil in comparison with the qualities of the oil before treatment. It is considered impractical or impossible to predetermine what variation of the general procedure may be the desirable one or the correct one to be used.

A feature of my invention regarded as quite essential in practical application, is the short time period between the points of heating from just below a temperature of appreciable cracking and the point of contact with the active molten mass. In instances I prefer to complete the steps including condensation of vapors to liquid form in a very short time. By thus limiting the time element the amount of cracking, which can occur before the oil comes under the influence of the active metal, is kept under control and limited. If a multiplicity of treating stages is utilized, the time at temperature and conditions of rearrangement under the influence of the metals may be conveniently extended to about a minute or so although with many oils and appropriate metals and conditions, the time may be reduced to a matter of seconds.

The formation of light fractions in a cracking zone of the usual type is thus limited. Active metal is used to influence such formation of light fractions and to form other lights by virtue of rearrangement of a character different from ordinary cracking. By so doing the quality of light distillate is improved or the amount of gas or amount of coke is reduced, or previously formed gases may be associated into liquid, or one or more of these features may be combined. Where the amount of light fractions formed in a stage is a fraction of that normally produced selected fractions are preferably retreated. In general metallic substance may be selected and used so that for the same time and same temperature, the yield of gasoline range is from about 5% to 20% greater and generally of greater stability and of better other qualities including color and odor.

It is the usual custom to deliberately break up substantially all of the heavy hydrocarbons into distillate of kerosene and lighter range. By one phase of my process I control the cracking so as to break up the more easily decomposed components while allowing the more stable which are suitable for lubricant and transformer oil and the like to remain. If the usual degree and extent of cracking is applied, good, stable components of most desirable form are destroyed. The usual conditions for cracking involve about fifteen minutes or a little longer at between about 300° C. and 500° C. and pressures up to about 700 lbs. The usual procedure is to employ a soaking tank or its equivalent wherein stubborn and resistant components of the oil remain at cracking temperature for from about an hour to several hours. Such tanks are well agitated so that the heavier stable components of the oil cannot be advanced and discharged in sequence of entrance.

By one phase of my invention I advance the heavier components of the oil through the soaking tank or its equivalent so that successive heavy portions are discharged in approximately the same sequence that they entered. In such manner the time element during cracking is controlled to be about alike for all of the portions not volatilized therein. In such manner I am able to segregate the stable large components of the oil without appreciable destruction thereof. Such relatively stable components of the oil may then be treated by active light metal to promote some rearrangement of the stable portions and considerable rearrangement of the unstable portions. The latter are generally converted into mineral seal oil or lighter distillate to the extent of between about 10% and 20% of the total heavy oil treated. I prefer to use a flow in the pipe still of between about 2 and 5 feet per second.

Thus I may utilize a method in which the total time of all parts at cracking temperature is substantially less than the usual. I prefer to operate with a time of less than about five minutes in the pipe still and a time of less than about ten minutes of soaking. In general I prefer to have alkali metal present during the soaking as I am thus able to promote or facilitate formation of lighter molecules from the less volatile. The time of reaction of vapors with metal may be from about a minute or so up to about ten minutes.

By using an adsorptive surface such as may be produced in my process to treat tarry oil from cracking or by using screened and sized coke or ground cinders of ashes or some form of ashes. I am able to produce a dry coke suitable for formation into a solid fuel. In some instances it is desirable to briquette such fuel as by using an oxidizable oil as a binder. The resulting mass from the soaking tank is more fluid and thus easily handled. I prefer to evaporate volatiles therefrom by spreading it in a thin film with careful temperature control as is obtainable with mercury. Lighter oil or vapors may be contacted therewith to facilitate removal of less volatile oil.

In the vapor phase cracking I prefer to conduct the cracking with occasional contact with a stream of flowing metal or by introducing slight amounts of vaporous sodium or like metal as indirectly by a carrier gas at high temperature. In this manner objections to vapor phase cracked gasoline are overcome and improved gasoline results. Where gasoline is formed by usual vapor phase cracking I prefer to flow vapors of gasoline so formed into contact with an oxidizing agent as for example a stream of hot liquid dinitrated benzol or molten or liquid mass containing the same and to then give the gasoline vapors one or several stages of contact with light active metals and inorganic compounds thereof. In using some oxidants, it is desirable to condense the vapors to a liquid before treatment with metal in the vapor phase. In any case I prefer that the metal treatment after oxidation shall be quickly performed and to the extent of a minimum value of gums. This and similar control to yield acceptable or optimum results are obtainable only by experimentation and test.

Common treatment involves sulfuric acid which consumes or wastes a considerable amount of desirable or useful portions. By my process these portions of the gasoline (apparently unsaturated bodies as distinguished from sulfur containing and saturated portions) are retained. In some instances where active hot fixed gases, as those fresh from cracking, are added to the gasoline, obtained from some oil, under influence of the metal the amount of that kind of desirable matter (removable by sulfuric acid) is increased. Thus those ordinarily produced are saved in amount and an additional amount may be added. In general pressure is desirable to promote the association to this form. For example the vapor phase gasoline may be condensed to a liquid, pumped to a high pressure stage and reevaporated to form a vaporous mixture with active fixed gases from cracking. Very mild oxidation after such association of fixed gases followed by metal treatment will generally yield a gasoline of less than about 5 mgs. of gum by the copper dish test which at the end of a month or so of storage will still be below about 20 or 25 mgs. of gum. Substantially all color and odor may be simultaneously removed. The general objections to vapor phase gasoline, are thus removed and desired qualities including high anti-knock rating is retained or may be increased. Thus for example the increase may be from a value of about 65% to 70% octane rating.

Another step which may be used in carrying out my invention is the treatment of oil with active metal before cracking as distinguished from the described rearrangement. For example higher than gasoline range distillate produced by rearrangement or by cracking which has been treated by the metal may be flowed through a pipe still in the usual manner and with a little treating agent if desired and with a resulting yield of about 80% of gasoline. Light hydrocarbons derived in producing a lubricant and the heavier products obtained by associating or combining fixed gases may thus be cracked when market requirements and conditions justify such procedure. Pretreatment of oil before cracking especially when combined with a shorter heating time yields better operation and lower maintenance costs.

With an ordinary cracking unit, a preferred mode of operation is to treat the gasoline as indicated by use of active metal and to fractionate, condensing motor fuel while permitting fixed gases to contact active metal under high pressure as by contact with a flowing stream of molten mass. By increasing the temperature of fixed gases or gases and some light vapors after separation of distillate, a better degree of association of such gases is possible. With this and similar conversions I prefer to maintain a multiplicity of stages of treatment which differ. Thus temperature or composition or both may be varied during procedure. In one manner of operation I prefer to remove sulfur and other impurities collectible as by anhydrous molten alkali hydroxide or the like with a slight amount of sodium for example and at 200° C. to 250° C. and to then increase the amount of free metal or to use more active compound in a subsequent stage of higher temperature and to then contact with higher concentration of metal and preferably at a temperature between about 350° C. and 500° C. whereafter the so activated and partially rearranged oil vapors may be flowed to another active zone at lower temperature or under higher pressure or both; a turbo compressor or the like may be utilized for promoting pressure change during such stages, the like being used as a turbine during expansion of the vapors. In such multistage operation it is thus possible to activate under one condition and to promote association under another condition. The critical points of such operation for practical speeds appeared to be between about 380° C. and 520° C. and the most active of the final stages is that found experimentally for the particular oil undergoing treatment. Likewise experimentation is used to determine whether vacuum, a hundred pounds or several hundred or a thousand pounds is to be used.

After treatment the product is preferably fractionated and certain fractions retreated by the active metal. As an example wax fractions may be segregated and retreated so as to form some portions of heavier oil and some portions of lighter oil therefrom. It appears that there is a relatively fixed amount of such wax or some other substance that will be altered to heavier form and another that will form lighter substance much as if equilibrium existed between molecular forms of different size. Under influence of the metal, the final outcome is dependent upon the temperature used, the pressure also influencing the outcome. Introduction of light vapors or fixed gases yields more of the heavier when tests have been made to determine conditions appropriate for such transformation.

Objections to hydrogenated oil include high sludge value and often high carbon formation. The advantages of hydrogenation may thus be utilized and with the ultimate production of an oil of lower sludge value and which on use in a gasoline motor will deposit much less carbon. As an example an oil of low viscosity index and relatively unstable may be hydrogenated in the well known manner to greatly increase the viscosity index and to increase stability somewhat. By mild oxidation and treatment with active metallic substance I am ample to increase resistance to sludge formation by from about 25% to several hundred percent. With Mexican and other impure oils I prefer to apply metallic treatment before hydrogenation as I am thus able to materially facilitate hydrogenation and preserve the catalyst and in some instance greatly increase its activity. In thus treating "overhead", activation results with improvements in the following hydrogenation wherefore I prefer that all low grade hydrogenation stock be so treated. If portions are not suitable for regular vapor phase treatment it may be treated in the liquid phase and contact filtration used before introduction into the zone of hydrogenation. In doing this there is often an advantage in diluting with light oil to facilitate separation of metal or the like or for settling. The gases (hydrogen and methane and olefines) preferably introduced in the "hydrogenation" chamber is preferably treated with active metal. As applied to hydrogenated oil, the color, viscosity index, carbon formation and stability are all improved.

In treating oil with the described short period of heating and soaking or for shorter periods, I realize a lower deposit of coke or carbonaceous matter particularly when I introduce active fixed gases in the zone of contact with the active metal. Rearrangement then produces some lower fractions of gasoline and somewhat higher boiling range with a less amount of deposited carbon. This appears to be due to the presence of the light vapors or fixed gases which seemingly unite with disrupted molecules in a manner to reduce the amount of free carbon thrown out. For example the yield of coke from Mexican oil may be thus reduced by several to about thirty percent or more. In some instance coke normally precipitated in the tubes or in the soaking chamber is collected by the circulating stream and removed from the reaction or contact zone by the stream thus facilitating isolation of formed coke or resinous or coke-like substance and increasing operating efficiency. When appreciable carbon-like matter is removed from the reaction zone, mineral oil may be used to effect concentration or removal thereof to purify recirculated mass. It is sometimes desirable that such oil with collected carbon-like matter be treated with filter aid and filtered or settled or otherwise separated so as not to unduly load that oil with impurities and to render it more suitable for reuse for such purpose or for treatment in another stage. With proper agitation it becomes possible to treat the oil to yield heavy settled particles and a fluid mass with more easily suspended particles. A portion or all of those may be settled or contact filtration may be resorted to, to effect their concentration or removal. Metal is sometimes contained in settled particles and may be concentrated or used as is for purification of oil.

Blending may be beneficially applied in operating my process. By experimentation it is frequently found that blending of oils of two or three sources will yield an oil of more desired sort than one or two alone. The oils to be blended may be "raw" or partially treated by my invention or otherwise. Under the influence of the active metal unusual rearrangement occurs and there is beneficial interaction between oils of two or more kinds. Thus for example a Mexican oil and an east Texas oil may be combined to yield oils which are economically better than either one treated separately at the same cost of treatment. In some instances blending before most of the treatment yields superior products to separately treated oils which are equivalently blended after treatment. The blending may be done after each oil has been separately raised to the cracking temperature or it may be accomplished as by introducing the light fractions or the fixed gases of one into vapors of the other or other similar blending procedure may be used.

Some portions of oil are preferably treated to a greater extent than others. For example, the whole or nearly the whole may be lightly oxidized and metal-treated. Light hydrocarbons inherent to the oil and those formed may then be distilled and passed through a contact zone or several thereof. The oil residual to such treatment may then be rapidly elevated to between about 300° C. and 500° C. and treated as under high pressure as elsewhere indicated. In such or equivalent manner detrimental action of cracking temperatures is reduced or eliminated on those portions which are previously removed. Similarly by shortening the period of time at such elevated temperature, gasoline range substance is not decomposed to a lower range or to fixed gas. Oil so treated may have been previously "topped" and the straight run gasoline treated with metal or combination of metals and controlled mild oxidation. Straight run gasoline may be benefited by short contact with alkali metal at between about 300° C. and 400° C. the rearrangement generally increasing the octane rating if it is not already high. I prefer to effect this treatment under moderate pressure. Where gum reduction is required mild oxidation may be applied in multiplicity with metal as required by experimental findings. As an example, I have sometimes found it desirable to apply metal, mildly oxidize, again apply metal, again oxidize and then finally apply metal again.

My invention is illustrated in the drawing. Closed reaction vessel or reactor 1 may be used for oxidation of oil introduced as by line 2 treated as by a multi-nitrated aromatic introduced as by indicated line 3. The mass is agitated as by means of shaft 4 rotating arms 5 carrying scraping blades 6 fitting tightly against the inner walls of 1. Other arms and scrapers may be provided to cover substantially all of the inner surface of the walls to avoid caking of the mass when heat is applied to the outside of the walls. A coil 7 may be used to introduce air or other gaseous fluid entering by line 8. A discharge line 9 may be used as for cleaning the apparatus. The outlet 10 connects with a reaction vessel 11 provided with blades 12 carried on arms 13 driven by shaft 14.

Molten alkali metal or dispersed molten compounds of alkaline metal including aluminum may be introduced as indicated by line 15. Heat may be induced, and in some instances reaction promoted, by means of winding 16. The vapors may flow out through line 17 and residual and treated liquid through outlet 18 to pump 19.

With many oils the oxidation which is required to be very mild, may be carried out at between about 150° C. and 250° C. It may be in the vapor phase and is preferably preceded by mild treatment with alkali or equivalent metal or by means of fused dehydrated alkali hydroxide or other compound of alkaline metal including aluminum chloride. The temperature of treating vessel 11 is preferably held at between about 200° C. and 300° C. I prefer to use a multiplicity of such vessels. The amount of metal or compound is preferably equivalent to about a pound or so of sodium per barrel of the oil. It is obviously essential that substantially all of the water be previously removed from the oil and it is desirable that water soluble components and those removable by alkaline wash be removed before treatment.

For such purpose, a vessel similar to 1 may be used for washing with caustic solution. Air may be introduced during such washing to assist in purification and to promote slight oxidation of some oils. Separation of the so treated oil may be effected as by decanting and withdrawing the wash water from 9, the oil flowing to a second vessel 11 whereat the small amount of the remaining water is vaporized with the first portion of distillate. The remaining oil may then be treated in the usual manner as by flow through the other vessels 1 and 7 of the illustration.

Treated oil is delivered by means of pump 19 to pipe still 20 whereat it is heated, rearranged and vaporized in part. Separation zone 21 provides space for separation and reaction may take place or continue therein. For blending 20 or 21 or both may be in multiple. Gases or light vapors may be introduced by means of line 22 to promote addition thereof to other oil vapors or gases. These gases are preferably freshly formed and active. The vapors flow through outlet 23 to contact tower 24 of which but one is shown. Liquid residual to the vapors may be returned to the pipe still if further heating is required. I prefer that there be a multiplicity of vessels 21 so that the liquid may flow from one to the other while reaction, treatment and vaporization is going on. The liquid effluent of the system discharges as by outlet to a reactor 26 which is preferably controlled as to temperature and agitated. This reactor may be in multiplicity as indicated by vessel 27 and it may be constructed similar to reactor 11. Additional amounts of alkali metal or equivalent metal or compound of metal may be applied therein. One of these vessels may be used for treatment with clay-like or other adsorptive surface as in contact treatment. Material may be charged therein as by lines 28 and 29 and outlets 30, 31, 32 and 33 may be used as required. Storage vessel 34 may be used for partial separation or merely for supplying pump 35 flowing liquid to separator 36. Reactor 27 may further serve as a cooler to facilitate separation of impurities after treatment as by partial crystallization of wax to be separated on fuller's earth or the like by means of a filter.

Separator 36 may operate as a vacuum still utilizing a heated drum 37 and resulting thin film. I regard it generally essential that the time of condensation be within about a second from the time of evaporation. With some oils it is preferable to thus condense and collect a portion and to allow a second portion to separately condense. Residual matter may be formed by high vacuum distillation and scraped by means of knife 38 into conveyor 39. Line 40 may be used for recirculation. When operating as a filter separator 36 may be as generally described in Patents 1,512,321; 1,667,465 and 1,693,417. The matter discharged by the conveyor 28 may be used for treating other oil as that of another system or as a preliminary treatment for oil treated by the illustrated arrangement. It is to be noted that the oil vapor will generally contain an appreciable amount of sodium or similar metal in the vapor phase.

While I prefer to operate pipe still 20 and separation zone 21 under pressures appropriate for cracking, the contact zone or tower 24 may be at a somewhat lower pressure. The contact zone is preferably in multiple with different composition of treating mass and/or different temperatures. Thus release valve or pressure regulator 41 may be provided. A molten mass containing sodium or other equivalently active light metal may be discharged in stream form from distributor 42. It treats vapors and gases therein and flows through outlet 43 and line 44 to storage and separation zone 45 whereat oil to be treated or partially or entirely treated oil may be introduced as by line 46 to remove finely divided active mass and collected impurities by discharge through outlet which may also serve as an inlet for oil, inert gas, treating agent or for other purpose. Oil from outlet 47 may flow to vessels of the group 26—27 for treatment and/or to vessel 1 whereat mild oxidation may be applied to the partly treated oil.

Line 48 may flow material to be electrolyzed from vessel 45 (preferably in multiple) or metal compound to be electrolyzed may be flowed into the system as through line 49. A cell 50 will electrolyze the compound to activate it and to form the required amount of freshly formed free metal. The active and freshly formed mass flows through lines 51 and 52 to pump tank 53 with submerged pump 54 driven by shaft 55 and flowing the circulating mass through line 56 to distributor 42. Line 57 may be used for introducing oil, inert gas, treating agent or other fluid into tank 53. Lines 58 and 59 may be used for discharge of fluids.

The outflow of vapors from contact zone 24 (preferably in a multiple of several, differently operating) passes to fractionator 60 with condenser 61, backflow line 62 and forward flow line 63. Line 64 may be used for vapors flowing upwardly from a still not shown. Refluxed liquid flows out through 65. Other types of fractionating system may be used. The general arrangement as illustrated may be used for producing gasoline, kerosene and lubricating oil and other fractions. The vapors from 17 may flow through contact zone 66 (preferably in multiple) with circulating mass flowing in through 67 and out through 68 to units similar to 45, 50 and 53. Treated vapors may flow through line 69 to condenser 70 with condensate outlet 71. A line for pressure control may be attached to 71 so that vessel 11 may be under vacuum or pressure as desired. The output from 71 or from 63 may be applied to treated liquid from vessel 21 to facilitate evaporation in vessel 36 or it may be used for cleaning the circulated mass of one or more contact zones. In some instances I prefer to add mildly oxidized and oxidized vapors or other vapors or gases by means of line 72 so that they may be chemically added to vapors from 21 or otherwise influence the ultimate nature of the outflow from zone 24 or from distillate line 63. Fractionator 60 may be under pressure if and as required. In general experimentation is required to determine how each oil should be treated and what treating agents should be used therefore.

Several of the features of my invention are disclosed and described in prior applications and this application is a continuation in part of the following: 482,267; 613,080; 613,151; 665,560; 668,241 and 668,499. Portions of the operating procedure which are not directly stated but implied may be readily understood by reference to French Patent No. 756,203. The treating agent may be prepared as indicated by French Patent No. 755,875. I do not limit my claims to the exact procedure or apparatus illustrated and I recognize that equivalents thereof may be utilized in carrying out the invention as generally described herein.

My process is exemplified by treatment of topped Smackover light oil which is introduced into vessel 1 and treated with about ¼% of dinitrobenzene and by addition of the small amount of air which is blown through coil 7 of vessel 1. The temperature of the reactor vessel 1 is preferably maintained at between 150° C. and 200° C. The slightly oxidized oil is then flowed into reactor and still 11 whereat the temperature is raised to about 350° C. in the presence of sodium which is added to the extent of about ½ pound per barrel. Vapors are flowed through contact zone 66 through which sodium hydroxide containing about 1% of sodium is circulated.

Heavy oil from vessel 11 is pumped through pipe still 20 whereat it is raised to a temperature of about 400° C. under a pressure of 200 pounds per square inch. Vapors from the separation zone flow through a contact zone 24 or a multiplicity thereof, as shown in French Patent No. 657,203, whereat it is treated as for example by a mixture of sodium potassium hydroxide containing ½ of sodium at a temperature of 400° C. and the secondary zone wherein pure sodium is circulated at a temperature of about 450° C. The so treated vapors are immediately fractionated in fractionator 60.

The oil which is residual to the vapors of separation zone 21 is discharged into reactors 26 and 27 wherein it is preferably treated with adsorptive clay-like material. Coarse fuller's earth may be introduced by means of line 29 and in admixture with a somewhat lighter oil while fine fuller's earth or rigid particles of activated and collined bentonite may be introduced as by means of line 29. I prefer that the amount of such material so added should not exceed about 5% of the weight of oil and in general about 1% is sufficient. During the treatment in vessels 26 and 27, which are maintained under pressure, the temperature is allowed to drop appreciably so that oil flowed through line 33 is at about 250° C. and the pressure is released and the oil supplied through the rotating drum 37 with electric or mercury heating means to promote evaporation of the oil under a vacuum corresponding to an absolute pressure of less than about 5 mm. The vapors from the separator preferably fractionated as for example in the apparatus of Serial No. 461,941 filed June 18, 1930, the vapors will contain roughly 20% or 30% of oil lower than lubricating range. The oil of lubricating range will be exceedingly stable as regards sludge formation and possessed of a viscosity index of about 80. The drum is preferably so that but a small amount of liquid is allowed to remain in a cake discharge by scraper 38. Tarry matter is held in place to facilitate evaporation by virtue of the added clay-like material which also absorbs considerable amount of the impurities. In general I prefer that the drum should not exceed a temperature above about 350° C. even though this involves discharge of a wet "cake".

Gasoline fractions obtained from condenser 60 and 61 may be blended. The resulting gasoline is characterized by being O. K. to doctor and copper corrosion tests. The flow and other factors are controlled so that the gasoline contains copper dish gum values of less than about 10 mgs. per 100 ccs. A Saybolt color of 30 may be obtained.

The benzol value of such gasoline, if normally about 60 is increased by from one to five points by my method.

The sulphur value of the gasoline is reduced to about .05% while the sulphur value of the oil is reduced to about ½% or lower depending upon the amount of metal added and the temperature and time of reaction. The initial sulphur content was roughly 3%.

In the case of a Mid-continent oil, my preferred method of operation involves a deviation from the above procedure in that the residual from outlet 26 is preferably cooled to about 200° C. and filtered or otherwise separated from residual metal after leaving vessel 26 so that on passage to reaction 27 it is fairly clear. At this point I prefer to add dinitrobenzene in the amount of about ¼% and after several hours of digestion at about 200–250° C. the product is treated with about 2 lbs. of sodium per barrel for a few hours and then flowed to the film still 36.

By such procedure the oil such as light water oil with an inherent viscosity index, of say 75 to 95, is increased to a viscosity index of well over 150 and such oil will deposit no appreciable amount of carbon on use in a gasoline engine. It is further exceedingly more stable as regards sludge values and devoid of organic acidity after some 3000 miles of use.

I claim:

1. A petroleum conversion process consisting in mixing finely divided alkali metal with the oil while advancing a restricted stream of the oil and metal at high velocity through a pipe still and into a separation zone to produce a temperature between 300° C. and about 500° C. therein, in separating vapors and delivering them to a reaction zone and purifying them by flowing a molten stream containing alkali metal through the zone and promoting rearrangement of the oil therein and fractionating and condensing vapors so treated and delivering residual liquid oil from the separation zone, in separating purified oil from the residue of treating metal and associated altered impurities to form an oil of lubricating range improved as to stability and viscosity index.

2. A petroleum conversion process consisting in mixing finely divided alkali metal with the oil, advancing a restricted stream of the oil and metal at high velocity through a pipe still and into a separation zone to produce a temperature between 300° C. and about 500° C. therein, in separating vapors and delivering them to a reaction zone and purifying them by flowing a molten stream containing alkali metal through the zone and promoting rearrangement of the oil therein while having mixed with the oil a substantial amount of fixed gases derived from cracking and associating portions of the gas with portions of the vapors by chemical combination, then fractionating and condensing vapors so treated, in delivering residual liquid oil and metal with associated impurities from the separation zone then separating purified oil from the residue of treating metal and altered impurities to form an improved lubricating oil of greater stability and higher viscosity index, and in maintaining a high pressure upon the pipe still and the separation zone.

3. The process of refining mineral oil which comprises adding an oxidizing agent to oil of a sort and to an extent that the oil will subsequently be mildly oxidized and to the extent that subsequent treatment with alkali metal may be controlled so as to yield a very stable oil, flowing the oil and the agent through a pipe still at high velocity and to attain a temperature between about 300° C. and 500° C. and to simultaneously crack and oxidize the oil and to vaporize a portion of the oil, flowing the hot vapors into contact with a stream of molten mass containing alkali metal, quickly condensing the vapors in fractions which are of substantially improved stability, treating residual hot oxidized oil in a reaction zone with alkali metal at a temperature of between about 250° C. and about 400° C. to form gasoline from a portion thereof and to increase the viscosity index of another portion of lubricating range and wherein the extent of treatment is controlled to yield substantial improvement as regards stability of lubricant derived therefrom and separating purified and improved oil from residual metal and altered impurities.

4. The process of refining mineral oil which comprises adding an oxidizing agent to oil of a sort and to an extent that the oil will subsequently be mildly oxidized and to the extent that subsequent treatment with alkali metal may be controlled so as to yield a very stable oil. flowing the oil and the agent through a pipe still at high velocity and to attain a temperature between about 300° C. and 500° C. and to simultaneously crack and oxidize the oil and to vaporize a portion of the oxidized oil, flowing the hot vapors into contact with a stream of molten mass containing alkali metal and quickly condensing the vapors in fractions, which are of substantially improved stability, treating residual hot oxidized oil in a reaction zone with alkali metal at a temperature of between about 250° C. and about 400° C. to form gasoline from a portion thereof and to increase the viscosity index of another portion of lubricating range and wherein the extent of treatment is controlled to yield substantial improvement as regards stability of lubricant derived therefrom and separating purified and improved oil from residual metal and altered impurities and wherein metal from the stream of molten mass is utilized for treating the residual oil.

5. The process of refining mineral oil which comprises mildly oxidizing the oil to the extent that subsequent treatment with alkali metal will render the oil unusually stable, treating the oil with dispersed alkali metal by flow at high velocity in a pipe still while raising the temperature thereof to its cracking point, delivering the oil and vapors to a separation zone, separating vapors and treating them in a reaction zone by flow therethrough of a molten mass containing fresh active alkali metal to promote rearrangement of the vaporized oil and to alter and remove impurities of the oil, and flowing oil residual to the vapors to a second separation zone and separating purified oil of lubricating range from residual metal associated with the oil residual to the vapors and so forming a stable lubricating oil of improved viscosity index.

6. The process of refining mineral oil which comprises mildly oxidizing the oil to the extent that subsequent treatment with alkali metal will render the oil unusually stable, treating the oil with dispersed alkali metal at between about 200° C. and 300° C. to alter impurities and form gasoline from heavier hydrocarbons and removing vapors by heating while agitating, treating oil residual to the vapors by flow at high velocity in a pipe still while raising the temperature thereof to its cracking point, delivering the oil and vapors to a separation zone, separating vapors and treating them in a reaction zone by flow therethrough of a molten mass containing an alkali metal to promote rearrangement of the vaporized oil, and flowing oil residual to the vapors from the separation zone of the pipe still to a second separation zone and separating purified oil from residual metal and collected impurities as a more stable oil of improved viscosity index.

7. The process of refining mineral oil which comprises mildly oxidizing the oil to alter portions thereof removable by contact with alkali metal at elevated temperature, treating the oxidized oil with alkali metal at between 250° C. and 400° C., removing vapors by applying heat during agitation of the so formed mass, flowing residual oil and associated residual metal through a pipe still at high velocity to raise the temperature to the cracking point of the oil, separating vapors formed during cracking and contacting them with a mild oxidizing agent capable of rendering portions separable by application of alkali metal at elevated temperature and to so reduce the gum value of the gasoline portion, and then applying alkali metal at between 300° C. and 500° C. thereto to remove oxidized impurities and lower the gum value, separating liquid oil residual to the cracking and separation and distilling the separated oil with alkali metal at between about 200° C. and about 350° C. from a thin film while maintaining a high pressure during cracking and a high vacuum during distillation of the liquid oil residual to cracking.

8. The process of refining oil of petroleum which comprises washing the petroleum with an alkaline solution, settling and separating water from the washed oil, distilling a portion of the oil to remove remaining portions of water, oxidizing the residual oil mildly to render portions removable by alkali metal, applying alkali metal to the oxidized oil to remove oxidized portions, flowing the so treated oil through a pipe still to reach about a cracking temperature, quickly separating vapors from heavy cracked oil, and then mildly oxidizing the cracked oil and applying alkali metal thereto in a manner to form a small amount of light hydrocarbons and a stabilized oil and separating the stabilized oil in purified form from the formed lights, impurities and applied metal.

9. The process of refining mineral oil which comprises treating the oil mildly with alkali metal to remove impurities, flowing so treated oil and an oxidant rapidly through a pipe still to oxidize the oil mildly that unstable portions may be readily removed by alkali metal and to crack a small amount of the oil, then separating the oil so treated into vapors and heavy liquid oil, treating the vapors with alkali metal at between 200° C. and 500° C., treating the separated liquid oil with alkali metal at between about 250° C. and 400° C. to form light fractions, and then quickly separating the so treated heavy oil in purified form from formed light fractions and metal.

10. An oil conversion process consisting in passing a restricted stream of petroleum oil through a heating coil and heating such oil during its passage through the coil to about its cracking temperature, then delivering the stream of heated oil to a zone of separation where a body of oil is maintained and separating vapors from the oil within the zone while maintaining appreciable pressure on the coil and the zone, removing residual oil from the separation zone within about ten minutes of its delivery thereto and discharging it to a separate and connected reaction zone containing alkali metal held in contact relation with the oil at a temperature between about 300° C. and about 400° C. to render impurities of the oil removable by distillation and while promoting molecular rearrangement of portions of the oil and forming light portions from heavy portions then forming vapors of the oil under vacuum and separating them into fractions one of which is purified oil of lubricating range and of increased stability.

11. An oil conversion process consisting in washing petroleum oil with an alkaline water such as sodium hydroxide and settling out water and removing it, distilling a small amount of oil to remove remaining water, then continuously advancing a restricted stream of so treated oil through a heated coil at a velocity of about five feet per second and heating oil therein to about a cracking temperature of the oil and delivering the oil to a series of separation zones while maintaining the oil under substantial pressure, then separating oil vapors from liquid oil, delivering separated liquid from the separation zones to a reaction zone after roughly ten minutes of holding in the zones of separation, and thereafter applying an active molten metal such as sodium to the oil at a temperature of between about 300° C. and 400° C. to alter impurities and render the same removable from purified oil by evaporation of the oil therefrom and to rearrange some of the oil into hydrocarbon of a gasoline range and then delivering the treated oil to an evaporator, and evaporating and recovering oil of lubricating range therefrom, and while maintaining a high vacuum on the oil in the evaporator.

12. An oil conversion process consisting in continuously advancing a restricted stream of petroleum oil through a heated coil and heating the oil therein to about its cracking temperature, then delivering the oil to a separation zone and separating light oil vapors therefrom while substantially continuously delivering separated liquid from the separation zone to a second similar separation zone and then to a reaction zone within a short time from the time of entering the first separation zone and applying an alkali metal to the oil while holding the reaction zone at between about 300° C. and about 400° C. to render impurities adsorbable by a clay-like substance in fine granular form and then applying such clay thereto and so promoting purification thereof, then filtering the resulting mass of oil and adsorptive clay to yield purified oil, and wherein light hydrocarbons are formed in the reaction zone by molecular rearrangement under the influence of the alkali metal and are subsequently removed from the oil by evaporation to yield improved oil of lubricating range.

13. The process of stabilizing lubricating oil and improving the viscosity index thereof which comprises treating heavy petroleum with a mild oxidant at about the cracking temperature of the oil and to form vapors of light portions of the oil so treated, treating oil residual to the vapors with alkali metal at temperatures between about 200° C. and 350° C. and under vacuum so as to promote molecular rearrangement of portions of the oil forming light hydrocarbons from heavy hydrocarbons and to alter and remove impurities and separating the heavy portions from residual metal and impurities and the formed light hydrocarbons by fractionation.

JUSTIN F. WAIT.